Dec. 3, 1968     J. C. WOODFORD     3,414,001
ANTI-SIPHON OUTLETS
Filed March 25, 1965     2 Sheets-Sheet 1
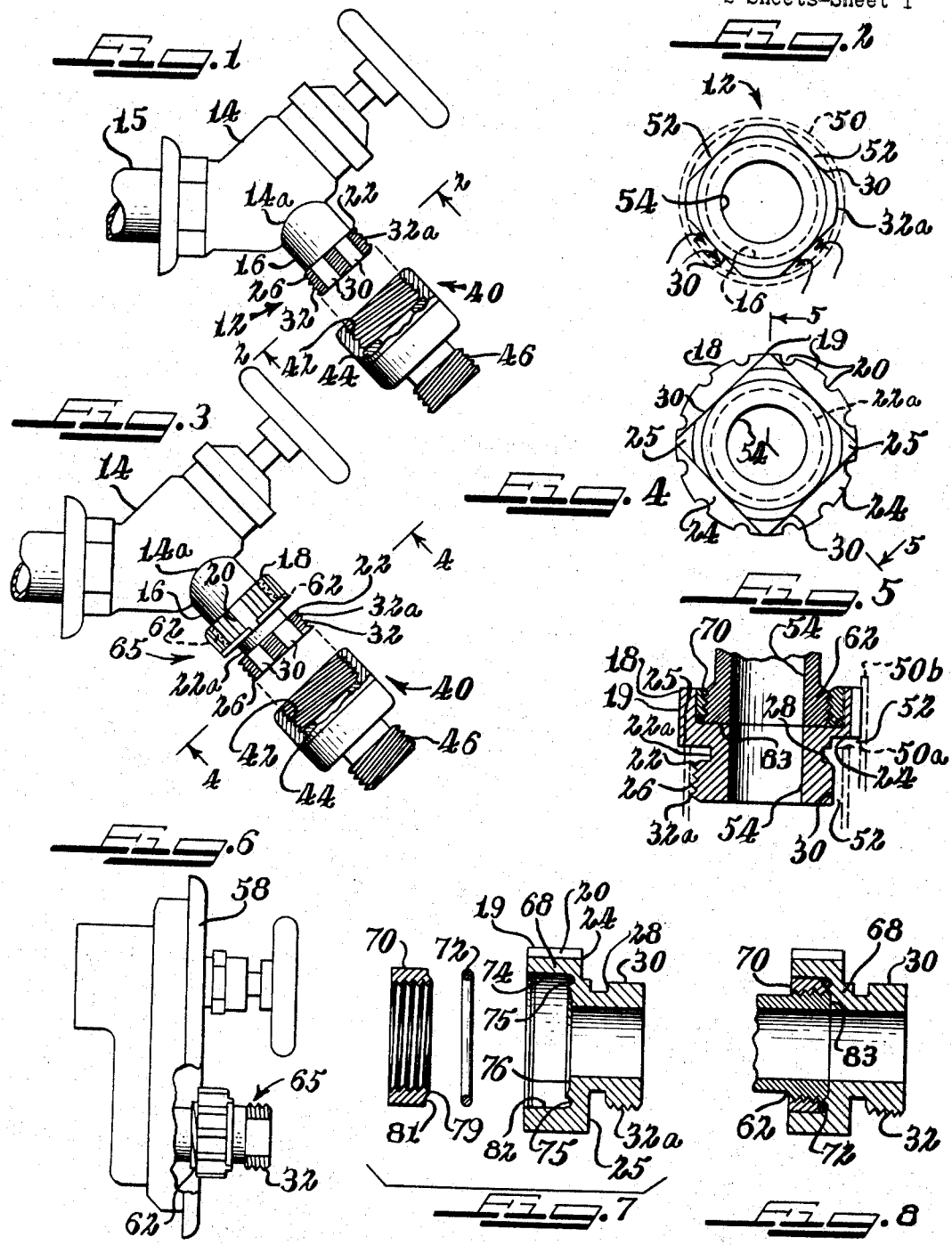
INVENTOR
JOSEPH C. WOODFORD
BY
Petherbridge, O'Neill & Aubel
Attys.

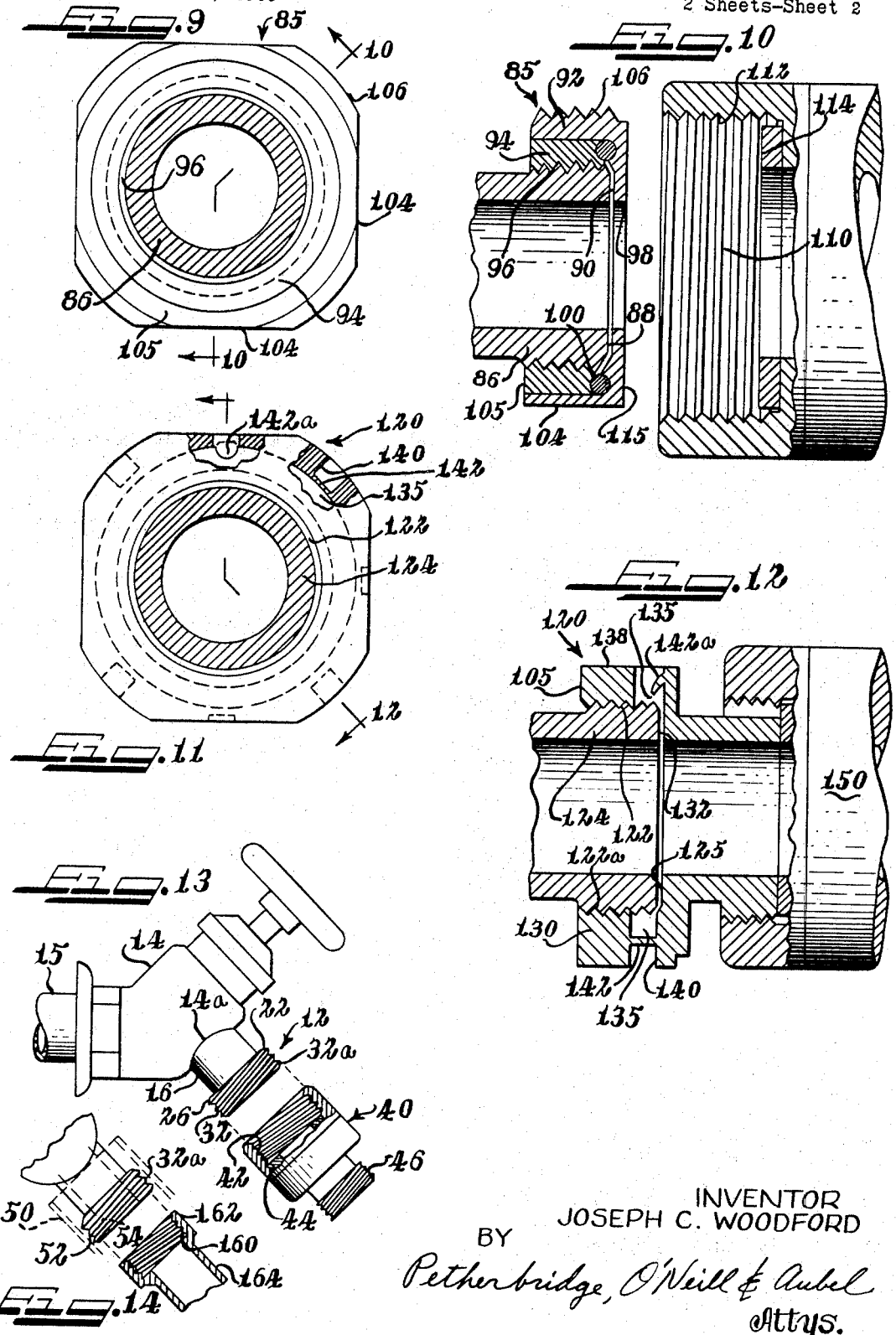

United States Patent Office 3,414,001
Patented Dec. 3, 1968

3,414,001
ANTI-SIPHON OUTLETS
Joseph C. Woodford, 203 N. Buchanan St.,
Spring Lake, Mich. 49456
Filed Mar. 25, 1965, Ser. No. 442,601
11 Claims. (Cl. 137—216)

ABSTRACT OF THE DISCLOSURE

A faucet outlet construction designed to accommodate a vacuum breaker which may be either permanently or temporarily secured thereto. In the case of a new faucet, the discharge end thereof is provided with non-standard screw threads to accommodate a vacuum breaker having cooperable non-standard screw threads. This makes it possible to connect and disconnect the vacuum breaker but prevents the use of the faucet with liquid conductors or hoses having standard threaded couplers. The threads of the faucet are provided with a plurality of peripherally spaced grooves extending in the general direction of flow from the faucet from the top to the bottom of the threads to prevent the insertion of a tube or hose over the threaded end and in liquid-tight engagement therewith. The grooves will provide passages between the faucet outlet end and the tube which will prevent back-flow of liquid in the faucet. A faucet adapter or extension can be used on previously installed faucets. This adapter or extension is permanently bonded to the distal end of the previously installed faucet and provides advantages similar to those of new faucet construction.

---

The present invention relates to anti-siphon outlets for faucets and the like and, more particularly, to a faucet outlet that is adapted to prevent airtight securement of a hose to said outlet.

The faucet outlet to be described more in detail below is still more particularly adapted to receive an anti-siphon fitting of a kind that is known in the trade as a vacuum breaker, which vacuum breaker is designed to prevent back siphoning of liquids from a hose through the faucet into the water supply system.

Faucets of the kind used for sill cocks, exterior of buildings, and faucets used in janitors' wash sinks as well as in laundry tubs and at other places, are usually provided with a connection having standard hose-coupling threads to receive commercially available hose couplings. Back siphoning can occur if the outlet end of a coupled hose is left in a vessel or gutter containing liquid, and for some reason the pressure in the faucet water supply line drops sufficiently to cause vacuum and back-siphonage of the liquid through the hose into the faucet and supply piping. Inasmuch as such liquids may be contaminated, it is imperative that means be provided to prevent such back siphoning of contaminated liquid into the water supply system.

In order to prevent such back siphoning, commercially available vacuum breakers are specified by many building codes for faucet installations. Some presently known vacuum breakers are adapted only to be built into certain types of faucets and many of these are quite large and must be space oriented, that is, they must be placed with respect to gravity so that floats and the like can operate properly so as to attain the opening of an air vent passage whereby to prevent back siphonage through a faucet. Many present faucets are not of the types conducive to receiving or containing such a relatively large or space oriented vacuum breaker and, accordingly, vacuum breakers have been provided which are compact in size and are capable of being applied to faucet outlets. One such vacuum breaker is shown in J. C. Woodford Patent No. 3,023,767.

It has been found, however, that with such conveniently adaptable vacuum breakers, the vacuum breaker may sometimes be removed from the faucet. If after removal of the vacuum breaker from the faucet, a standard hose coupling can be attached to the thread of the faucet or a large internal diameter piece of hose or tubing can be slipped over the male threads of the faucet to effect an airtight connection, back siphoning conditions may exist. Accordingly, the primary supply of water can become contaminated in the event back siphoning occurs.

The ever increasing danger of pollution of potable water systems by back-siphonage of contaminated liquid into the water system requires the installation of protestive vacuum breakers or anti-siphon devices on potable water outlets. Plumbing authorities can require the installation of such devices and make proper inspection to approve the original installation. However, it is not possible for inspectors to make frequent re-inspections of the multitude of such installations. It is therefore vitally important to assure that the anti-siphon protection cannot be defeated by the removal of the anti-siphon device after the original inspection and approval.

The faucet outlet of the present invention prevents back siphoning even if the vacuum breaker is removed and therefore represents an improvement in faucets to be equipped with vacuum breakers.

My invention comprises an outlet which can be made integral with a new faucet or can be soldered onto existing faucets so as to provide faucet installations with the attributes of the present invention.

It is extremely difficult if not impossible to properly solder a simple threaded fitting onto many installed faucets by conventional soldering methods because solder cannot be made to flow to all points required to be soldered together in order to get a watertight connection and a connection that is not easily broken by using a wrench on the fitting to remove it. With the solder type outlets of my invention a proper soldered connection is assured so that the soldered connection is watertight and the outlet cannot be removed without extreme effort.

The present invention is characterized by preventing airtight attachment of a hose to the faucet outlet when the vacuum breaker is removed. The faucet outlet is equipped with special threads, which will receive the vacuum breaker with a watertight connection to the faucet but which prevents standard hose couplers from being connected with an airtight connection on the threads. The outlet also precludes a hose from being slipped over the outlet in airtight securement. The threads and parts of my faucet outlet are sized and shaped so that even if a hose is slipped onto the outlet or a standard coupler is placed against the outlet, there are still ample passageways for air, between the hose or coupler and outlet to prevent back-siphonage conditions in the faucet. The outlet has shoulder portions or means affording air passages to atmosphere between the hose and the outlet to prevent back-siphoning of liquid from the house into the faucet.

Accordingly, it is a broad object of this invention to provide improved anti-siphon outlets for faucets and the like.

A further object in keeping with the preceding object is to provide improved anti-siphon outlets for faucets and the like.

A further object in keeping with the preceding object is to provide an anti-siphon outlet as an integral part of a faucet, which outlet is further adapted to receive a vacuum breaker and which prevents airtight connection of a hose to the outlet.

A further broad object of the invention is to provide an anti-siphon outlet which has shoulder means in different arrangements whereby to provide air passages between the outlet and hose or standard coupler to prevent back siphoning even though different sizes of hoses are placed on the outlet.

Another object is to provide such an anti-siphon outlet that is adapted to be soldered onto standard faucets.

Another object of the invention is to provide an anti-siphon outlet in the form of a solder containing fitting in which the final solder assembly is completed by the application of heat after connection with a faucet.

A further object of the invention resides in providing an outlet according to preceding objects which comprises very few parts, which can be solder assembled to a faucet in an existing installation and which enables a secure watertight soldered connection to be made between the outlet and faucet even in faucet installations where conventional soldering techniques could not produce a secure watertight connection.

A still further object of the invention is to provide an outlet according to preceding objects which is made of a single piece of stock fabricated so as to provide practical means for applying solder to all points to produce a secure and watertight connection of the outlet to the faucet in situ in an installation.

The foregoing and other objects and advantages of the invention will be either obvious or pointed out in the following specification and claims read in conjunction with accompanying drawings in which:

FIG. 1 is a diagrammatic view of a faucet having the anti-siphon outlet of this invention as an itengral part of the faucet;

FIG. 2 is an enlarged view of the face of the outlet taken on line 2–2 of FIG. 1;

FIG. 3 is a diagrammatic view of a standard hose thread faucet including a solder-on type of anti-siphon outlet of this invention;

FIG. 4 is an enlarged view of the face of the outlet taken on line 4–4 of FIG. 3;

FIG. 5 is a sectional view taken along line 5–5 of FIG. 3;

FIG. 6 is a diagrammatic view of another form of a standard hose thread faucet including the solder-on type of anti-siphon outlet of FIGS. 3 thru 5;

FIG. 7 is an exploded view of the parts of the solder-on anti-siphon outlet of FIGS. 3 thru 6;

FIG. 8 is an assembled view of a section of the outlet of FIG. 7 shown soldered on a standard male thread of a faucet;

FIG. 9 is an enlarged top view of a solder-on outlet adaptable to larger size vacuum breakers;

FIG. 10 is a sectional view taken generally on line 10–10 of FIG. 9;

FIG. 11 is a view similar to FIG. 9 but shows a modification of the solder-on outlets shown in previous figures;

FIG. 12 is a sectional view taken generally on line 12–12 of FIG. 11;

FIG. 13 is a diagrammatic view of a modified form of a faucet having the anti-siphon outlet of this invention formed as an integral part of a faucet in the form of special threads; and FIG. 14 is a detailed view of FIG. 13.

Referring to the drawings, and first to FIG. 1, an anti-siphon outlet constructed in accordance with the present invention is generally indicated at 12. In this embodiment of the invention the outlet 12 is formed as an integral part of a faucet 14, which can be used in wash tanks, janitor sinks, etc. The faucet 14 is suitably secured to a supply pipe 15 that is connected to the water supply system. It is to be understood that the faucet 14 may be any of several types, including those used in service stations, homes, apartment houses, factories, etc., to which are connected hoses that can be submerged in receptacles or troughs having contaminated liquids. Under normal conditions a vacuum breaker 40 is mounted on threaded end 32 by means of threads 42 and gasket 44 provides a watertight connection. Vacuum breaker 40 is provided with a standard hose coupling threaded connection 46 to receive commercially available hose connectors, such as a ¾" hose connector. With the vacuum breaker 40 in place, back siphoning is prevented by the vacuum breaker. However, the vacuum breaker may be improperly removed for repair or removed for some other reason and under these conditions back siphoning must still be prevented.

The outlet 12 includes a neck portion 16 and a downwardly extended portion 26 with threads on its exterior to provide the threaded end 32 of the outlet 12. Neck portion 16 is smaller in diameter than threaded end 32 to provide an upwardly facing shoulder 22. Threaded end 32 has flattened or grooved shoulders 30 spaced around the threaded end and these flattened or grooved areas extend the full height of portion 26. The shoulders and threads 32a, or as sometimes referred to as shoulder means, are cooperatively arranged to provide air passages for accomplishing a vacuum breaking function as hereinafter described.

Threads 42 of the vacuum breaker are sized to fit threaded end 32, but threaded end 32 has specially sized or formed threads 32a, which has the number of threads and/or diameter mismatched to commercially available hose coupler threads. In a specific embodiment of the invention, as presently produced, the threads 32a have a 1⁵⁄₃₂" diameter with 11½ threads per inch. This size is too large to accept ¾" size garden hose coupling threads, and too small, or the wrong pitch, to connect with chemical hose coupling threads or larger size water hose coupling threads.

Standard hose coupling diameters and threads are charted below:

|  | Thread diameter (in.) | No. of Threads Per Inch |
| --- | --- | --- |
| Garden hose | 1¹⁄₁₆ | 11½ |
| Chemical hose | 1⅜ | 8 |
| Other hoses (in.): | | |
| ¾ | 1¹⁄₃₂ | 14 |
| 1 | 1¹⁹⁄₃₂ | 14 |
| 1¼ | 1⅝ | 11½ |

The special threads 32a are utilized so that no standard hose coupler can be threaded into airtight engagement with the outlet 12 and back siphoning is thereby prevented. Even if an oversized hose coupling is placed on the outlet, an airtight connection would not exist. However, it is possible that some users of faucets may find hoses that can be frictionally fitted without a coupling over the end of an outlet of this type. It is an important attribute of the invention that even with such a hose or tubing fitted over the end of the outlet, an airtight securement cannot be made, since the outlet provides air breaks or air passages between the hose and outlet to prevent back siphonage of contaminated liquids.

Referring to FIG. 2, which is an end view of outlet 12, the several shoulders 22 and 30 and 32a collectively and/or severally provide air passages between the outlet and a hose slipped thereover. In FIG. 2 a piece of hose, indicated by dotted lines at 50, is shown placed over the threads 32a and illustrates that air passages 52 are provided so that air can freely flow, as indicated by the arrows, from the atmosphere around the outlet 12 into the internal passageway 54. The valleys of the special threads 32a also provide such air passages. Under these conditions when a vacuum exists in the supply line 15, there will not be a back siphonage of contaminated liquid through the faucet because ambient air surrounding the outlet 12 will flow freely into the water system to thereby prevent a vacuum from being created. The shoulders are so shaped and spaced that air passages will be provided for almost any size or type of hose that can be slipped onto the outlet regardless of whether the hose is slipped part way onto the outlet or all the way onto the outlet. Also, even if a larger hose were frictionally placed over the entire outlet 12, the rounded contour of the faucet at 14a (FIG. 1) would prevent the hose from being pressed against the faucet in airtight engagement and inhibit back siphoning through the faucet.

Hence even with the vacuum breaker removed back siphoning is prevented by my novel outlet under the conditions that will be encountered.

While I have previously described an embodiment of my invention where the outlet is formed integrally with a faucet, it is not practical to replace all presently installed faucets or try to machine them in situ to incorporate the outlet of my invention. Accordingly, I have developed an anti-siphon outlet that may be mounted on conventional faucets either in situ or before installation. This anti-siphon outlet is so constructed and arranged that the outlet can be soldered onto almost all faucets in situ and provide a secure, water tight connection, which is essential.

FIG. 3 diagrammatically shows a faucet 14 having a threaded portion 62 for receiving standard garden hose connectors. In order to provide anti-siphon features, such as described above, a solder-on outlet 65 is provided, and now will be described. FIG. 6 shows a sill cock 58 which is of a flush mounted type having a threaded portion 62 for receiving standard garden hose connectors, and provided with solder-on outlet 65.

FIG. 7 shows parts which are used to make the solder-on outlet 65, and FIGS. 4, 5 and 8 show such parts in assembled solder-on relationship with the threaded portions 62. In FIGS. 4, 5 and 6 shoulder means 30 are similar to the shoulder means 30 described in connection with the preceding figures, and these shoulder means may be identically shaped and sized to attain the same end purpose of providing passages for air between the outlet and hose or hose connector. Also in FIGS. 3, 4, 5 and 6 other like portions of outlet 65 are labeled by the same reference characters used in FIGS. 1 and 2.

Referring to FIG. 7, the solder-on outlet 65 comprises a lower body part 68, an upper part 70 in the form of an internally threaded ring, and a solder ring 72. The lower body part 68 is provided with the aforesaid shoulder means and additional shoulder means to be described and has an upper cup part 74 which has a recess or groove 75 for receiving the solder ring 72. The bottom part 68 also has an internal flange or face 76. In assembling the outlet, the solder ring 72 is placed in the annular groove 75 and the upper ring 70 is securely fitted into the internal diameter 82 of the cup portion 74 in final sub-assembly. The ring 70, solder ring 72 and body part 68 in final sub-assembly, are thereby securely held together with all these parts in snug and circumferential engagement with each other, and can withstand rough handling in shipping, installation, etc.

As seen in FIG. 7, it will be noted that ring 70 has an annular projection 79 that forms a recess 81 in the lower face of ring 70. Thus, as seen in FIGS. 5 and 8, when the parts are assembled, solder 72 is held between recess 81 and recess 75. This positionment of the solder assures a secure water tight connection between the outlet and the faucet.

For assembling the solder-on outlet 65 on the threaded portion 62, the threads and face 83 of threaded portion 62 are polished clean, and fluxed with a suitable flux for aiding soldering. The flange 76 and internal threads of ring 70 can be fluxed at that time also.

To complete in situ assembly of the anti-siphon outlet or fitting on a faucet, the outlet 65 is screwed onto the threaded portion 62 until face 83 engages flange 76 as seen in FIGS. 5 and 8. With the solder-on connector 65 thus attached, heat is applied as by a flame from a torch to the surfaces of the outlet and the threaded portions 62 and played around the parts. Heat will be conducted towards the solder which will liquify. The solder 72 will flow between and around the flange 76 and face 83 of portion 62 as well as flow between the threads of portions 62 and ring 70. The solder may also flow between adjoining surfaces of the parts 68 and 70. This construction assures a firm watertight connection between the outlet and faucet. Since the solder reaches all of the essential parts to be connected together at the very locations where they must be securely soldered together the outlet will not leak and cannot be readily removed from the faucet.

It is to be noted that securement of solder-on outlet 65 by the above method prevents removal of the outlet from the faucet without applying destructive forces to the parts.

After outlet 65 is soldered to the faucet the vacuum breaker is then threaded onto threaded end 32 of the outlet and the installation is completed.

The construction and arrangement of the solder-on outlet, whereby the solder is positioned exactly at the desired locations is of substantial importance because with many faucet installations it is almost impossible to produce secure, watertight connection by conventional soldering means. For example, with the flush faucet shown in FIG. 6, it would be extremely difficult if not impossible to solder my outlet onto threaded portion 62 by trying to feed solder either in through the open center of the outlet or down between the threads. The solder will not reach the upper areas of the threaded connection or the face 83 of the threaded connection and an insecure and leaking connection results. There are other types of faucets and faucet installations (such as FIG. 3) where improper soldering results from conventional soldering techniques and yet with the solder-on outlet of this invention a proper soldering connection is easy to achieve.

Since as previously discussed, the vacuum breaker may be improperly removed, outlet 65 is constructed and arranged to prevent back siphoning when a hose is applied to the outlet.

In a preferred design, the outlet 65 (as shown in FIGS. 3 through 8) has an enlarged head 18, which has external shoulders 19 spaced apart by grooves 20. A groove is formed around the outlet to provide a recessed shoulder 22a and an upwardly facing shoulder 28. The lower face of enlarged head 18 is suitably formed to provide downwardly facing shoulders 24 and 25. Shoulders 24 and 25 are parallel but with shoulders 24 spaced above shoulders 25. In FIG. 4 four shoulders 25 are shown and four shoulders 24 are shown with shoulders 25 spaced apart by shoulders 24.

Below shoulder 22a is the downwardly extending portion 26 of the outlet 65 which forms upwardly facing shoulders 28. Portion 26 has threads 32a on its exterior to provide the threaded end 32 of the outlet 65. As previously described threaded end 32 has flattened shoulders 30 spaced around the threaded end and these flattened shoulders extend the full height of portion 26. The various shoulders, or as sometimes referred to as shoulder means, are cooperatively arranged to provide air passages fo accomplishing the vacuum breaking function as hereinafter described.

Referring to FIG. 5, the several shoulders 19, 22, 22a, 24, 25, 28, 30 and 32a collectively and/or severally provide air passages between the outlet and a hose slipped thereover. In FIG. 5 a piece of hose having an end, indicated by dotted lines at 50a, is shown placed over the threads 32a. The end 50a of the hose is illustrated in FIG. 5 as abutting shoulders 25 and is limited in upward movement by shoulders 25.

The section line 5—5 of FIG. 4 is taken through an angle to show the position of the hose end 50a with respect to the several shoulders. It will be seen that the shoulder means provide a plurality of passages 52 between the hose and outlet so that air can freely flow from the atmosphere around the outlet 12 into the internal passageway 54. As shown at the right hand side of FIG.

5 when a larger hose having end 50b is slipped over the outlet 65 including enlarged head 18 air passages will be provided between the hose and outlet. Under these conditions when a vacuum exists in the supply line 15, there will not be a back siphonage of contaminated liquid through the faucet because ambient air surrounding the outlet 12 will flow freely into the water system. The various shoulders are so shaped and spaced that air passages will be provided for almost any size or type of hose that can be slipped onto the outlet regardless of whether the hose is slipped part way onto the outlet or all the way onto the outlet.

FIGS. 9 and 10 show an outlet constructed in accordance with the present invention for larger size vacuum breakers. Inasmuch as the female threads of larger vacuum breakers may be substantially larger than the standard faucet threads, the anti-siphon outlet of FIGS. 9 and 10 can be made somewhat simpler in construction and requires less shoulder means for providing passageways for air.

The fitting 85 comprises an outer cup 92, an inner sleeve 94 threaded to engage the screw threads 96 of the faucet, and a solder ring 100. The solder-on outlet 85 is adapted to screw onto a threaded portion 86 of a faucet after the surfaces of the threaded portion, internal flange 90 and lower face 88 of the faucet have been suitably cleaned and fluxed. With heat applied to the inner and outer surfaces around the passageway 98 of the fitting 85, heat will penetrate to the solder ring 100 causing it to liquify and flow to all the essential points for a proper solder connection.

A vacuum breaker 110, FIG. 10, of the kind mentioned above but of larger size, is provided with non-standard threads 112 adapted to mate with threaded portions 106 of the solder-on outlet 85 in the same manner as hereinbefore described. A gasket 114 is adapted to engage a bottom surface 115 of the cup 92 to form a liquid-tight seal between the vacuum breaker and outlet 85.

The outlet of FIGS. 9 and 10 has the same attribute of preventing back siphonage of liquids as pointed out in connection with the above-described embodiments of the invention. If a hose is slipped over the threads 106 the shoulder means 104 and 105 of the outlet will still provide air passages between shoulders 104 and 105 and the hose. Thus airtight sealing of a hose around the periphery of the outlet 85 is inhibited to prevent back siphoning of liquid.

FIGS. 11 and 12 relate to an embodiment of the invention made from a single piece of metal and incorporates structure whereby the outlet can be soldered onto many installed faucets. The solder-on outlet 120 is adapted to screw onto threads 122 of a threaded portion 124 of a faucet. The body 130 of fitting 120 is made from a single piece of stock and has shoulder means like those described in connection with the outlet of FIGS. 3 through 8, except that shoulders 138 are utilized to serve the function of shoulders 19 in FIGS. 3 through 8.

The body 130 is internally threaded to form hose coupling size threads 122a, and is provided with an interior flange 125 adapted to abut the lower surface 132 of the threaded portion 124. As previously described, the abutting surfaces are cleaned and fluxed for aiding reception of solder. In this embodiment of the invention there is no solder provided as a component prior to mounting of the outlet upon the faucet.

The body 130 has an internal groove 135 extending completely around the interior of the body adjacent the interior flange 125. Spaced around the exterior of the body 130 are flat bottomed holes 140 drilled to a sufficient depth to provide a thin web of metal 142 between the hole and external groove 135. The webs 142 have only sufficient strength to be physically stable and prevent escape of molten solder, and are adapted to be readily punched in as indicated at 142a at the top of FIGS. 11 and 12.

In assembling this embodiment of the invention to a faucet, the solder-on fitting 120 is screwed onto threaded portion 124 until the surface 132 abuts the flange 125. With the solder-on fitting 120 in this position the topmost web 142 is punched in as shown at 142a in FIGS. 11 and 12. If desired, the punched in web 142a can be entirely removed from the hole 140 or the punched in web 142a can be left in place without interfering with the operation of soldering.

With the solder-on outlet 120 in position on the faucet and the web 142 punched inwardly, the outlet 120 and threaded portion 124 can be heated to a temperature permitting flow of solder. Solder in wire form is then fed into the hole 140 having the punched in web 142a. The solder will liquify due to heat of the fitting and flow around groove 135 and between surface 132 and flange 125 and between the threads by either gravitational force or capillary action, or both, to provide a complete circumferential ring of solder securing the solder-on outlet 120 to the faucet. Thus faucets, such as in shown in FIG. 6, which do not permit soldering on an outlet by conventional means, can be easily equipped with the solder-on outlet 120 to which vacuum breaker 150 (FIG. 12) can be attached.

In the embodiments of my invention as previously described, it should be appreciated that the non-standard threads (for example threads 32a and 106) also serve to provide an air passage between the outlet and a hose or hose coupler slipped over the non-standard threads. In other words the various parts of the non-standard threads onto which the vacuum breaker is adapted to be threaded also serve as shoulder means to provide air passages. In certain cases the air passages provided by the non-standard threads are sufficient to eliminate the necessity of providing additional air passages by machining or otherwise providing additional shoulder means on the anti-siphon outlet. In FIGS. 13 and 14 I have shown an anti-siphon outlet 12, in form of special threads 32a provided as an integral part of a faucet 14, and in FIGS. 13 and 14 like numbers have been used to designate like parts shown in previous figures.

Referring to FIG. 14, threads 32a are mismatched with threads 160 of standard hose coupling 162 and thereby prevent airtight coupling of hose 164 to outlet 12. A piece of hose indicated by dotted lines 50 is shown placed over threads 32a, and illustrates that air passages 52 are provided so that air can flow from the atmosphere around the outlet 12 into the internal passageway 54 of the outlet. Under these conditions, when a vacuum exists in the supply line 15, there will not be a back-siphonage of contaminated liquid through the faucet because ambient air surrounding the outlet 12 will flow freely into the water system to prevent a vacuum being created within the faucet. The air passageways will exist with any size or type of hose or standard hose coupler that can be slipped onto the outlet regardless of whether they are slipped part way onto the outlet or all the way onto the outlet. If a larger hose were frictionally placed over the entire outlet 12, the rounded contour of the faucet at 14a would prevent the hose from being pressed against the faucet in airtight engagement. Thus, even with the vacuum breaker removed, back siphoning is prevented. As previously explained, air passageways 52 may be enlarged by removing parts of the threads 32a and/or machining away parts of the outlet to form additional shoulder means.

While I have shown and described in detail different embodiments of the present invention, other modifications thereof will occur to those skilled in the art. Accordingly, I do not wish to be limited in my invention to only the specific embodiments shown and described.

I claim:

1. An anti-siphon faucet outlet adapted to receive a vacuum breaker and to prevent the airtight and fluid-tight connection of a standard hose coupling directly to the outlet of the faucet, said faucet comprising a body having an inlet opening, a fluid flow passage connecting the inlet opening with a fluid discharge outlet and end surface of the faucet body bordering the fluid discharge outlet being formed in the body for disposition in complementing relationship with a complementing end surface of a vacuum breaker and in fluid-tight engagement therewith, and air passage means disposed on the body of said faucet outlet adjacent the fluid-tight vacuum breaker securement means and extending from said end surface to prevent the fluid-tight coupling of hose means thereto including a connector portion extending from the end surface of the body, the connector portion being formed of non-standard dimensions to prevent the fluid-tight securement thereto of standard hose coupling means.

2. In combination, an antisiphon faucet outlet and a vacuum breaker, cooperable connecting means on said vacuum breaker and on the body of said faucet outlet, the cooperable means including an end surface on the body of said faucet outlet bordering the outlet portion thereof for disposition in complementing sealed relationship with a complementing surface of said vacuum breaker to be attached to the body of said outlet in liquid-tight engagement, the body portion of said faucet outlet adjacent said end surface and the portion of said vacuum breaker adjacent said complementing vacuum breaker surface being provided with fluid-tight coupling means of non-standard dimensions, and air passage means provided on the body of said faucet outlet to prevent the fluid-tight coupling of hose means thereto in the absence of said vacuum breaker, said air passage means being sealed from fluid leakage from said faucet outlet when said vacuum breaker is cooperably connected thereto, by said non-standard fluid-tight coupling means.

3. In combination, an anti-siphon outlet for faucets and a vacuum breaker, and cooperable means including threads of non-standard dimensions on said vacuum breaker and outlet to enable said vacuum breaker to be attached to said outlet, the cooperable means further including an end surface on the body of said faucet outlet bordering the outlet portion thereof for disposition in complementing sealed relationship with a complementing surface of said vacuum breaker, hose coupler threads of non-standard dimension to thereby prevent fluid-tight attachment of standard liquid conductor connections directly to said outlet when said vacuum breaker is detached from said outlet, a plurality of grooves cut through said threads and providing an air and fluid passage along the exterior of said outlet when a hose is telescoped over said threads in the absence of said vacuum breaker.

4. In combination, a faucet and a solder-on, antisiphon extension outlet therefor, said faucet including a fluid discharge opening at an end thereof and a threaded portion with an end surface adjacent the discharge opening, said extension outlet having a body with a passageway therethrough and openings at opposite ends thereof for passing liquid from the faucet when connected thereto, an internal threaded portion in said body threaded onto said distal threaded portion of the faucet, a flange in said body disposed adjacent said faucet end surface, a groove around said extension body disposed adjacent said flange and end surface and containing solder, whereby the application of heat secures said faucet end surface and extension flange together by soldering to provide air-tight and mechanical securement of said outlet to said faucet, said body having thread means to connect a vacuum breaker to said outlet, said thread means being constructed to prevent attachment of standard hose connectors, and irregular shoulder means on said body to provide for continuous communication between the atmosphere and said passageway when a tube is placed on said connecting means.

5. The apparatus of claim 4 wherein said body has at least one opening communicating with said groove and solder is fed to said groove through said opening.

6. A solder-on fitting for a faucet having a distal threaded portion, said fitting having a body with a passageway therethrough and openings at opposite ends thereof for passing liquid from a faucet when connected thereto, an internal threaded portion in said body for threading onto a distal threaded portion of a faucet, a flange in said body disposed adjacent an end surface thereof, a groove around said body disposed adjacent said flange and end surface and containing solder, whereby the application of heat will secure a faucet end surface and fitting flange together by soldering to provide fluid-tight and mechanical securement of said fitting to a faucet, said fitting body having thread means and an end surface thereon to connect a vacuum breaker to said outlet in fluid-tight relationship, said thread means being constructed to prevent attachment of standard hose connectors, and irregular shoulder means formed on said thread means to provide for continuous communication between the atmosphere and said passageway when a flexible tube is telescoped over said thread means.

7. An adapter for a faucet outlet comprising a body, the body having a passage therethrough including a fluid inlet opening at one end thereof and a fluid outlet opening at another end thereof, means adjacent the fluid inlet opening for producing the fluid-tight securement of the adapter to a faucet outlet, an end surface of the body bordering the outlet opening formed in the body for disposition in complementing relationship with a complementing end surface of a vacuum breaker and in fluid-tight engagement therewith, and air passage means disposed adjacent the fluid-tight vacuum breaker securement means to prevent the fluid-tight coupling of hose means thereto including a threaded portion extending from the end surface of the body, the threads of the threaded portion being of nonstandard dimensions to prevent the fluid-tight securement thereto of hose coupling means.

8. The adapter of claim 7, the means to prevent fluid-tight coupling of hose means adjacent the fluid inlet opening comprise enlarged shoulder means on the body disposed adjacent the fluid inlet opening and at least one discontinuity is provided across the shoulder means to provide a continuous air passage when hose means are telescoped over the inlet end of the adapter thereby preventing fluid-tight coupling of such base means to the adapter.

9. The adapter of claim 7 wherein means are provided for permanently securing the adapter to a faucet outlet.

10. An adapter for a faucet outlet comprising a body, the body having a passage therethrough including a fluid inlet opening at one end thereof and a fluid outlet opening at another end thereof, means adjacent the fluid inlet opening for producing the fluid-tight securement of the adapter to a faucet outlet, an end surface of the body bordering the outlet opening formed in the body for disposition in complementing relationship with a complementing end surface of a vacuum breaker and in fluid-tight engagement therewith, and means disposed adjacent the fluid-tight vacuum breaker securement means to prevent the fluid-tight coupling of hose means thereto including at least one surface irregularity commencing adjacent the end surface of the body and extending away therefrom, the surface irregularity providing a continuous air passage when hose means are telescoped over the outlet end of the adapter thereby preventing fluid-tight coupling of the hose means to the adapter.

11. An anti-siphon faucet outlet adapted to receive a vacuum breaker and to prevent the airtight and fluid-tight connection of a standard hose coupling directly to the outlet of the faucet, said faucet comprising a body having an inlet opening, a fluid flow passage connecting the inlet opening with a fluid discharge outlet and end surface of the faucet body bordering the fluid discharge outlet being formed in the body for disposition in complementing relationship with a complementing end surface of a vacuum breaker and in fluid-tight engagement therewith, and air passage means disposed on the body of said faucet outlet adjacent the fluid-tight vacuum breaker securement means and extending from said end surface to prevent the fluid-tight coupling of hose means thereto including a threaded portion extending from the end surface of the body, the threads of the threaded portion being of non-standard dimensions to prevent the fluid-tight securement thereto of standard hose coupling means.

References Cited

UNITED STATES PATENTS

| | | | |
|---|---|---|---|
| 693,830 | 2/1902 | Burke | 285—287 |
| 2,174,218 | 9/1939 | Greene | 285—287 |
| 2,234,957 | 3/1941 | Boynton | 285—81 X |
| 2,691,986 | 10/1954 | Kirby | 137—216 X |
| 2,695,797 | 11/1954 | McCarthy | 285—391 X |
| 3,023,767 | 3/1962 | Woodford | 137—525.5 X |
| 1,209,063 | 12/1916 | Steneck | 285—12 X |
| 1,540,906 | 6/1925 | Schweinert | 285—12 |
| 2,426,303 | 8/1947 | Graber | 285—8 X |
| 2,947,994 | 8/1960 | Saulson et al. | 285—8 X |
| 3,065,763 | 11/1962 | Howard | 137—223 |

WILLIAM F. O'DEA, Primary Examiner.

D. H. LAMBERT, Assistant Examiner.

UNITED STATES PATENT OFFICE
CERTIFICATE OF CORRECTION

Patent No. 3,414,001

December 3, 1968

Joseph C. Woodford

It is certified that error appears in the above identified patent and that said Letters Patent are hereby corrected as shown below:

Column 6, line 59, "fo" should read -- for --. Column 8, line 20, "in", first occurrence, should read -- is --. Column 9, line 22, after "to", first occurrence, insert -- enable said vacuum breaker to --.

Signed and sealed this 7th day of April 1970.

(SEAL)
Attest:

Edward M. Fletcher, Jr.
Attesting Officer

WILLIAM E. SCHUYLER, JR.
Commissioner of Patents